(12) United States Patent
Fredlund et al.

(10) Patent No.: US 8,035,747 B2
(45) Date of Patent: Oct. 11, 2011

(54) IMAGE DIGITAL PROCESSING BASED ON EDIT STATUS

(75) Inventors: John R. Fredlund, Rochester, NY (US);
Aaron T. Deever, Pittsford, NY (US);
Steven M. Bryant, Holly, NY (US);
Kenneth A. Parulski, Rochester, NY (US); Robert J. Parada, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1247 days.

(21) Appl. No.: 11/684,663

(22) Filed: Mar. 12, 2007

(65) Prior Publication Data

US 2008/0166102 A1 Jul. 10, 2008

Related U.S. Application Data

(60) Provisional application No. 60/883,589, filed on Jan. 5, 2007.

(51) Int. Cl.
*H04N 5/14* (2006.01)
(52) U.S. Cl. ........................................ 348/576; 382/254
(58) Field of Classification Search .......... 348/252–256, 348/625, 627–630, 576; 382/254
See application file for complete search history.

(56) References Cited

U.S. PATENT DOCUMENTS

| | | | | |
|---|---|---|---|---|
| 5,184,214 A | * | 2/1993 | Tatsumi | 358/500 |
| 5,526,051 A | * | 6/1996 | Gove et al. | 375/240.01 |
| 6,646,688 B1 | * | 11/2003 | Rennert et al. | 348/592 |
| 6,671,405 B1 | | 12/2003 | Savakis et al. | |
| 6,868,190 B1 | | 3/2005 | Morton | |
| 6,972,828 B2 | | 12/2005 | Bogdanowicz et al. | |
| 7,042,519 B2 | * | 5/2006 | Lim | 348/627 |
| 7,042,523 B2 | * | 5/2006 | Haider et al. | 348/675 |
| 7,046,400 B2 | * | 5/2006 | Gindele et al. | 358/3.27 |
| 7,113,306 B1 | * | 9/2006 | Nakabayashi et al. | 358/1.9 |
| 7,586,546 B2 | * | 9/2009 | Lee et al. | 348/625 |
| 7,738,740 B2 | * | 6/2010 | Ruggiero | 382/302 |

(Continued)

FOREIGN PATENT DOCUMENTS

JP 04051665 * 2/1992

(Continued)

OTHER PUBLICATIONS

"Source-Adaptive Encoding Options for HDTV and NTSC" by Kenneth Parulski et al., SMPTE Journal, Oct. 1992 Issue, vol. 101, No. 10, Society of Motion Picture and Television Engineers, Inc. pp. 674-683.

(Continued)

*Primary Examiner* — David Harvey
(74) *Attorney, Agent, or Firm* — Robert L. Walker; Kevin E. Spaulding

(57) ABSTRACT

In a method for producing output from an image record, the type of input unit supplying the image record is determined. The image record is classified into one of a predetermined plurality of different edit statuses. The classifying utilizes as input the determined type of input unit. The edit statuses are inclusive of unedited status and very-edited status. The image record is digitally enhanced. During the enhancing material alteration of the image record is constrained. The enhancing is more constrained when the edit status is very-edited and less when the edit status is other than very-edited. The image record is rendered to match a predetermined output unit. The resulting image record is output in viewable form.

15 Claims, 8 Drawing Sheets

U.S. PATENT DOCUMENTS

2006/0153470 A1 * 7/2006 Simon et al. .................. 382/254
2006/0274156 A1   12/2006 Rabbani et al.

FOREIGN PATENT DOCUMENTS

| JP | 11179984 | * | 7/1999 |
| JP | 2005-260447 | * | 9/2005 |

OTHER PUBLICATIONS

White Paper of Digital Still Camera Image File Format Standard, EXIF, (Exchangeable Image File Format for Digital Still Camera) Version 2.2, JEITA CP-3451(draft), Feb. 5, 2002, Standard Japan Electronics and Information Technology Industries Association.

* cited by examiner

IMAGE DIGITAL PROCESSING BASED ON EDIT STATUS

CROSS REFERENCE TO RELATED APPLICATIONS

This is a 111A Application of Provisional Application Ser. No. 60/883,589, filed Jan. 5, 2007.

Reference is made to commonly assigned, co-pending U.S. patent application Ser. No. 11/684,751, entitled: DIGITAL VIDEO STABILIZATION WITH MANUAL CONTROL, filed Mar. 6, 2007, in the names of Aaron T. Deever, Robert J. Parada, John R. Fredlund, which is hereby incorporated herein by reference.

FIELD OF THE INVENTION

The invention relates to methods for utilizing image records and to systems such as television systems, which utilize image records and more particularly relates to television digital processing based on edit status.

BACKGROUND OF THE INVENTION

Digital imaging has vastly increased consumers ability to produce viewable images from both professional and amateur image records on the same output system. The term "viewable image" is used herein to refer to images that can be visually perceived, such as light images produced by a display and hard copy images produced by a printer or press. The term "image record" is used herein to refer to a digital still image, video sequence, or multimedia record. Output systems sometimes provide minimal automated digital processing of the output image records. In other cases, "one-size-fits-all" processing is provided. These approaches work best with a narrow range of input and are not helpful for image records that do not fit that narrow range. Manual (user directed) digital processing is commonly available and is not particularly burdensome in some situations, such as editing and printing individual still images. On the other hand, manual digital processing can be very burdensome for editing video sequences. Manual processing is also not suitable for use during casual viewing. Output systems that display images, also referred to herein as "display systems", are, thus, particularly suitable for automated digital processing.

Examples of playback systems include home entertainment systems, televisions, and portable devices providing similar functions. Many playback systems now include subsystems that apply sophisticated image processing algorithms. Such algorithms can alter one or more of: noise, contrast, color balance, brightness, and other image quality parameters. Such algorithms can greatly improve consumer image records, particularly image records that have never been edited or have been captured using a camera lacking in sophisticated image processing. Such algorithms can also modify the "look" of professional image records. The term "look" is used herein in the same sense as in U.S. Pat. No. 6,868,190 to Morton and U.S. Pat. No. 6,972,828 to Bogdanowicz et al., which are hereby incorporated herein by reference. These patents disclose procedures for maintaining a desired "look" in a motion picture. "Look" includes such features of an image record as: sharpness, grain, tone scale, color saturation, image stabilization, and noise. These references teach modification of input image records of a known look to create an output image record of a different look. Unfortunately, in many cases, the look of the input record is not known or characterized.

Modifying the look of professionally prepared image records raises issues of whether artistic values have been compromised. It is a shortcoming of many playback systems that image records are all automatically modified. This is problematic if the look is changed.

It is known to modify the encoding/compression of TV images depending on the source, as explained in "Source-adaptive encoding options for HDTV and NTSC" by Parulski, et al, *SMPTE Journal*, October 1992, pages 674-683.

U.S. Pat. No. 6,671,405 to Savakis et al. teaches use of a Bayesian network or group of networks to provide an automatic ranking of consumer images in terms of their logical order based on an automatic assessment of emphasis and appeal, but the ranking of images is determined for automatic album page assembly. U.S. Pat. No. 6,671,405 describes a number of features that have been selected based on a ground truth study of the preference of human observers. These features include people related features: the presence or absence of people, the amount of skin or face area and the extent of close-up based on face size; objective features: the colorfulness and sharpness of the image; and subject related features: the size of main subject and the goodness of composition based on main subject mapping. The outputs of the feature extraction stage thus represent statistical evidence of the presence (or absence) of certain features; the outputs are then integrated by the classification stage to compute a value representative of the likelihood that the image is of the type the network is designed to detect.

It would thus be desirable to provide methods and systems that overcome these shortcomings.

SUMMARY OF THE INVENTION

The invention is defined by the claims. The invention, in broader aspects, provides a method and system for producing viewable output from an image record. In the method, the input unit supplying the image record is determined. The image record is one of a plurality of different types. The image record is classified into one of a predetermined plurality of different edit statuses. The classifying utilizes as input the determined type of input unit. The edit statuses are inclusive of unedited status and very-edited status. The image record is digitally enhanced. During the enhancing material alteration of the image record is constrained. The enhancing is more constrained when the edit status is very-edited and less constrained when the edit status is other than very-edited. The image record is rendered to match a predetermined output unit. The resulting image record is output in viewable form.

It is an advantageous effect of the invention that improved methods and systems are provided, in which output of an image record is improved by applying image processing based upon the source of the image record.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

Figure 1:
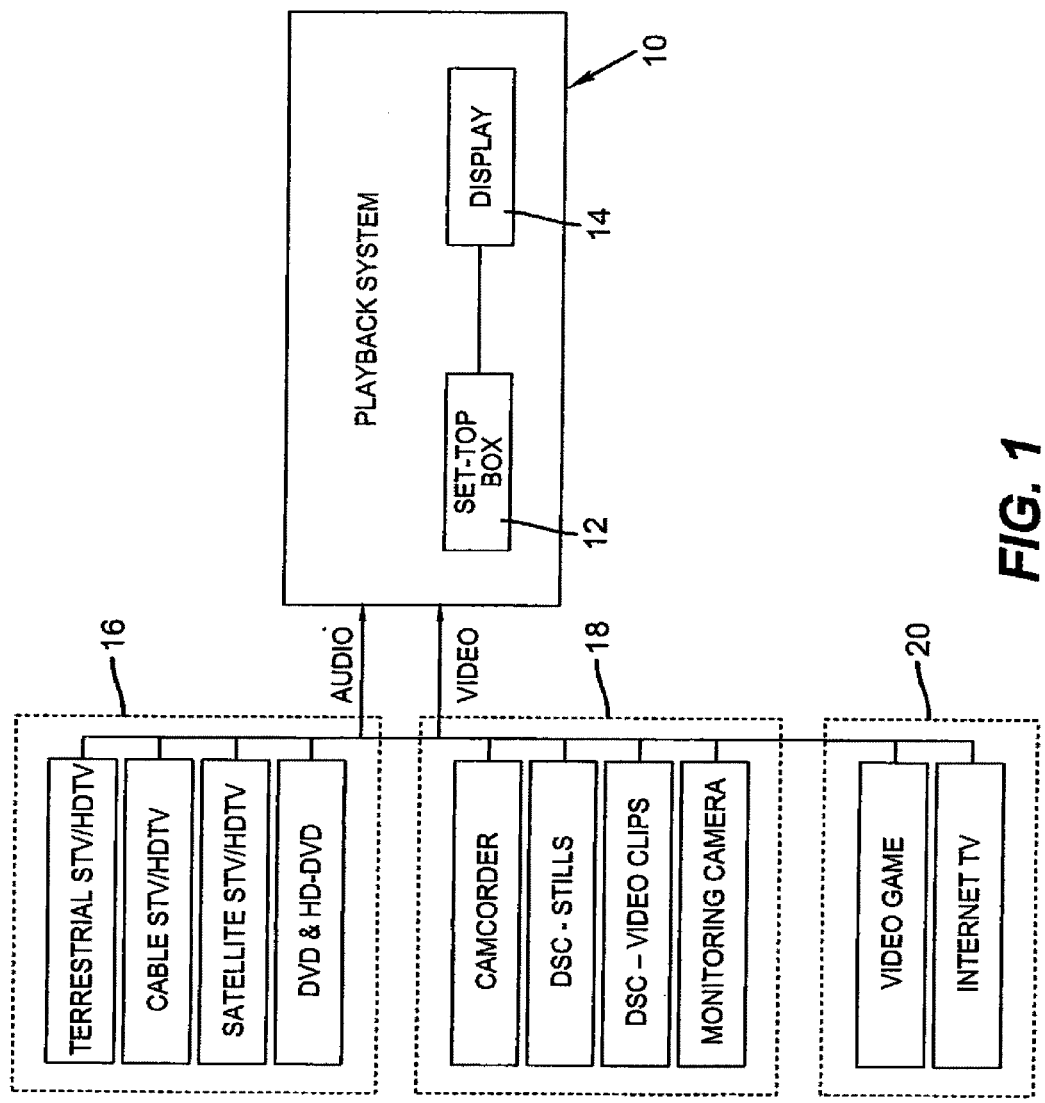
FIG. 1 is a diagrammatic view of an embodiment of the system showing some possible content sources.

Levels of detail differ as to particular features in the different figures.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The term "image record" is used in the same sense as earlier indicated to a digital still image, video sequence, or multimedia record. An image record is inclusive of one or more digital images and can also include metadata, such as sounds or textual annotations. A particular image record can be a single digital file or multiple, but associated digital files. Metadata can be stored in the same image file as the associated digital image or can be stored separately. Examples of image records include still images, video sequences, and multimedia video presentations. With a video sequence, the sequence of images is a single image record. Each of the images (frames) in a sequence is also an image record and can be so treated. If a video sequence is treated as a collection of shorter, multiple frame sequences, then each of those sequences is also an image record. While the method and system are generally described herein in relation to image characteristics of image records, other characteristics that can be subject to digital processing, such as audio, can be dealt with in the same manner. Likewise, discussion here is generally directed to production and display of viewable images. Except as apparent from context, considerations applicable to display of still images apply to output of hard copy images by printers, presses and the like.

The term "display", as used herein, is inclusive of any devices that produce light images, including emissive panels, reflective panels, and projectors. The "display" is not limited to separate displays, but rather is inclusive of displays that are parts of other apparatus, such as the display of a cell phone or television or personal video player. A display presents videos at a particular video frame rate. The video frame rate is predetermined by the source material and the capabilities of the display and other components of the system. In the video sequences herein, it is preferred that the frame rate is twenty-four frames per second or greater, since slower rates tend to have an objectionable flicker. A convenient rate is thirty frames/second, since this rate is commonly used for broadcasting consumer video.

The term "rendering" and like terms are used herein to refer to digital processing that modifies an image record so as to be within the limitations of a particular output device. Such limitations include color gamut, available tone scale, and the like.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. General features of the types of computerized systems discussed herein are well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

It should also be noted that the present invention can be implemented in a combination of software and/or hardware and is not limited to devices, which are physically connected and/or located within the same physical location. One or more of the components illustrated in the figures can be located remotely and can be connected via a network. One or more of the components can be connected wirelessly, such as by a radio-frequency link, either directly or via a network.

The present invention may be employed in a variety of user contexts and environments. Exemplary contexts and environments include, without limitation, use on stationary and mobile consumer devices, wholesale and retail commercial use, use on kiosks, and use as a part of a service offered via a network, such as the Internet or a cellular communication network.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non-rectilinear arrays with equal effect.

In each context, the invention may stand alone or may be a component of a larger system solution. Furthermore, human interfaces, e.g., the scanning or input, the digital processing, the display to a user, the input of user requests or processing instructions (if needed), the output, can each be on the same or different devices and physical locations, and communication between the devices and locations can be via public or private network connections, or media based communication. Where consistent with the disclosure of the present invention, the method of the invention can be fully automatic, may have user input (be fully or partially manual), may have user or operator review to accept/reject the result, or may be assisted by metadata additional to that elsewhere discussed (such metadata that may be user supplied, supplied by a measuring device, or determined by an algorithm). Moreover, the methods may interface with a variety of workflow user interface schemes.

FIG. 1 shows an embodiment of the system 10. In this embodiment, a playback system produces viewable output from an image record using a set-top box 12 and a display 14. The set-top box provides functions including, but not limited to analog tuning, digital channel selection, media playback (using, for example, a DVD player or memory card reader), and program storage (for example, using a hard drive). A list of possible inputs is categorized into three general types of content sources, classified as "professional" content 16 (e.g. terrestrial broadcast TV, DVDs), "consumer" content 18, (e.g. Camcorder, DSCs, Baby monitoring camera), and "special" content 20 (e.g., video games, Internet TV). The display can be in the form of a television or a television receiver and separate monitor, for example.

Figure 2:
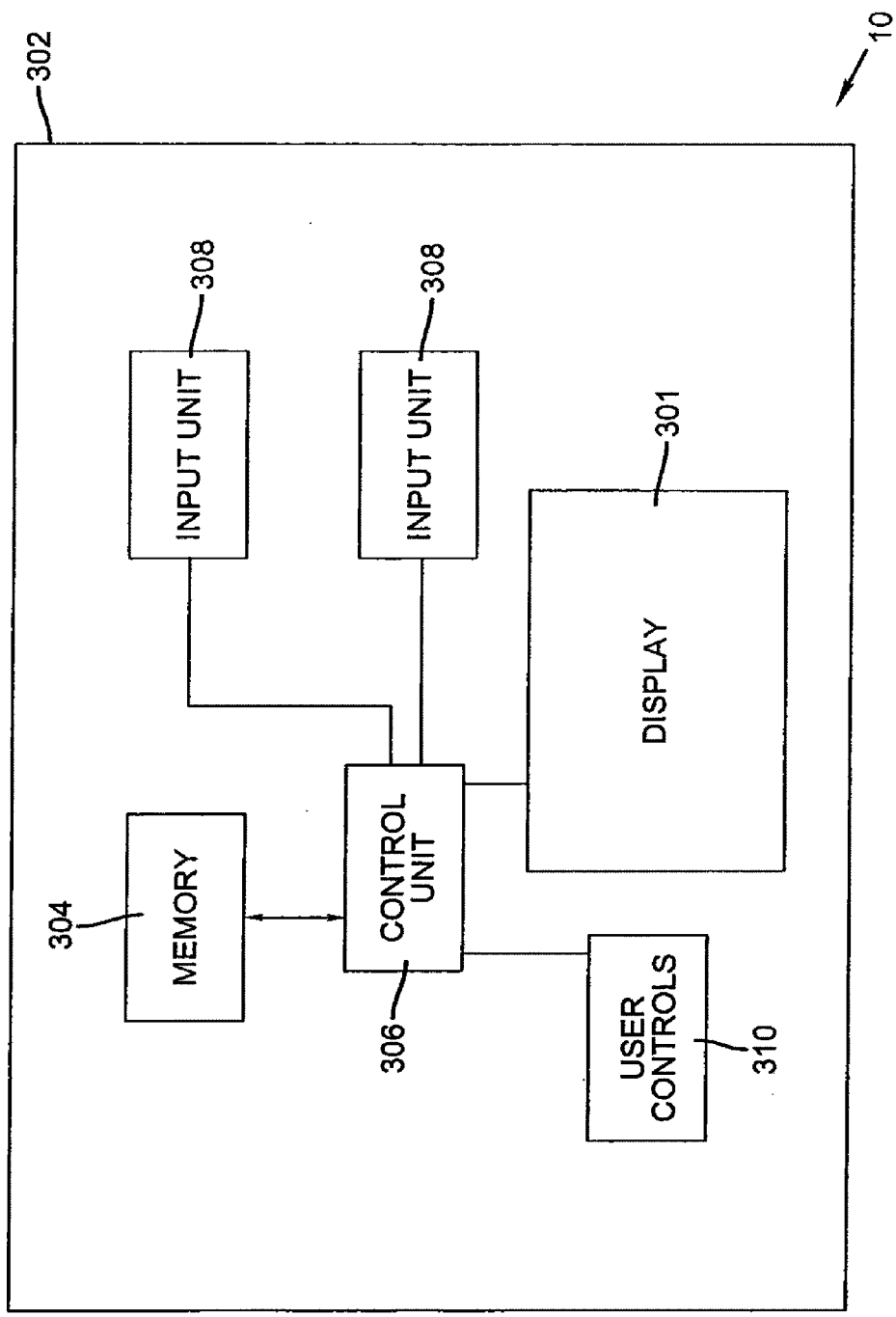
FIG. 2 is a diagrammatic view of another embodiment of the system.

FIG. 2 illustrates another embodiment of the system 10. In this embodiment, viewable output is displayed using a one-piece portable display device, such as a DVD player, personal digital assistant (PDA), digital still and/or video camera, or cell phone. The device has a housing or enclosure 302, display 301, memory 304, control unit 306, input units 308, and user controls 310 connected to the control unit 306. The enclosure 302 can be hand-held, that is, small and light enough to be held in one hand by the average person. Components 302, 304, 306, 308, 310 are connected by signal paths 314 and, in this embodiment, the system components and signal paths are located within the housing 302 as illustrated.

Figure 3:
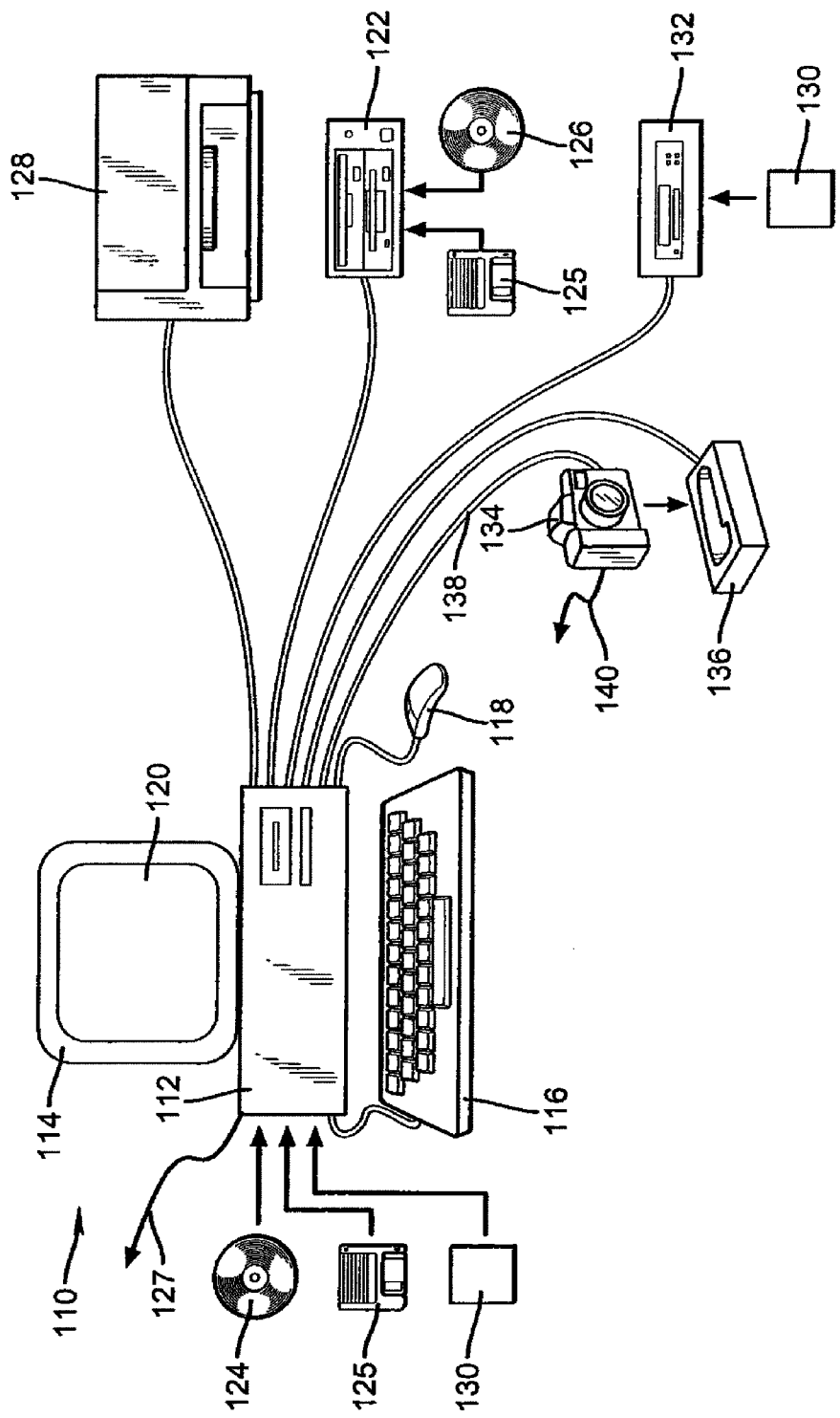
FIG. 3 is a diagrammatic view of still another embodiment of the system.

The system can also take the form of a portable computer, a kiosk, or other portable or non-portable computer hardware and computerized equipment. In all cases, one or more components and signal paths can be located in whole or in part outside of the housing. An embodiment including a desktop computer and various peripherals is shown in FIG. 3. In this embodiment, a display image or printed image can be produced. The computer system 110 includes a control unit 112 (illustrated in FIG. 3 as a personal computer) for receiving and processing software programs and for performing other processing functions. A display 114 is electrically connected to the control unit 112. User controls, in the form of a keyboard 116 and mouse 118 are also connected to the control unit 112. Multiple types of removable memory can be provided (illustrated by a CD-ROM 124, DVD 126, floppy disk 125, and memory card 130) along with appropriate components for reading and writing (CD/DVD reader/writer and disk drive 122, memory card reader 132). Memory can be internal or external and accessible using a wired or wireless connection, either directly or via a local or large area network, such as the Internet. A digital camera 134 can be intermittently connected to the computer via a docking station 136, a wired connection 138 or a wireless connection 140. A printer 128 can also be connected to the control unit 112 for printing a hardcopy of the output from the computer system 110. The control unit 112 can have a network connection 127, such as a telephone line, ethernet cable, or wireless link, to an external network, such as a local area network or the Internet.

FIGS. 2 and 3 do not show a list of inputs, but could be used with the same list as or a list similar to that of FIG. 1.

Figure 4:
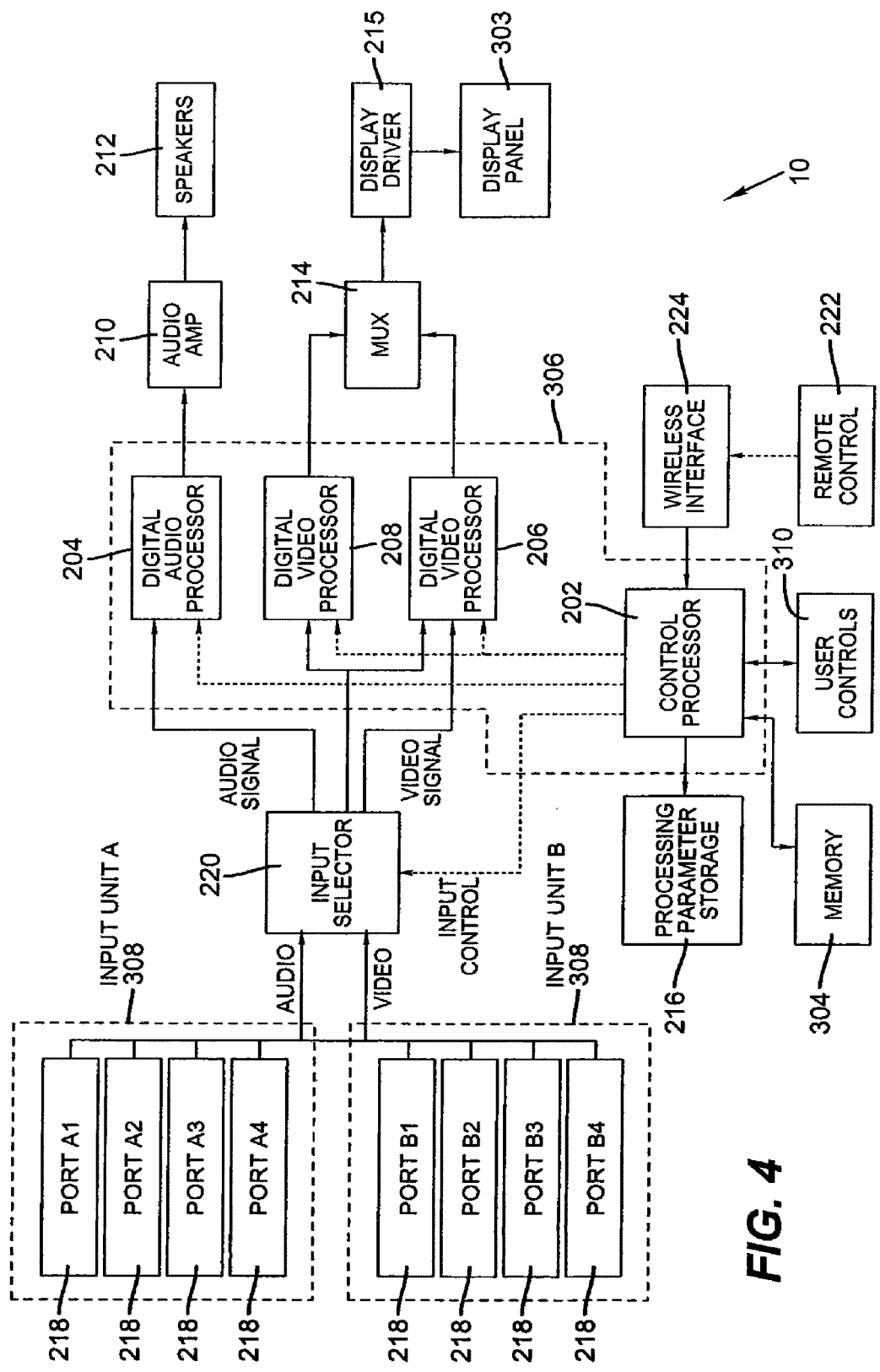
FIG. 4 is a function diagram of the embodiments of FIGS. 1-3.

Different components of the system can be completely separate or can share one or more hardware and/or software features with other components. An illustrative diagram of function components, which is applicable to all of the embodiments of FIGS. 1-3, is shown in FIG. 4. Other features that are not illustrated or discussed are well known to those of skill in the art. For example, a system can be a cell phone camera.

The user controls 310 can comprise any form of transducer or other device capable of receiving an input from a user and converting this input into a form that can be used by the processor. For example, the user interface can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. User controls can include one or more sensors, which can include light sensors, biometric sensors, and other sensors known in the art that can be used to detect conditions in the environment of system and to convert this information into a form that can be used by processor of the system. Light sensors can include one or more ordinary cameras and/or multispectral sensors. Sensors can also include audio sensors that are adapted to capture sounds. Sensors can also include biometric or other sensors for measuring involuntary physical and mental reactions such sensors including but not limited to voice inflection, body movement, eye movement, pupil dilation, body temperature, and the p4000 wave sensors. User controls can be local or remote. A wired or wireless remote control 222 that incorporates hardware and software of a communications unit and one or more user controls like those earlier discussed can be included in the system, and acts via an interface 224.

A communication unit or system can comprise for example, one or more optical, radio frequency or other transducer circuits or other systems that convert image and other data into a form that can be conveyed to a remote device such as remote memory system or remote display device using an optical signal, radio frequency signal or other form of signal. A communication system can be used to provide image records to an input unit and to provide other data from a host or server computer or network (not separately illustrated), a remote memory system, or a remote input. The communication system provides the processor with information and instructions from signals received thereby. Typically, the communication system will be adapted to communicate with the remote memory system by way a communication network such as a conventional telecommunication or data transfer network such as the Internet, a cellular, peer-to-peer or other form of mobile telecommunication network, a local communication network such as wired or wireless local area network or any other conventional wired or wireless data transfer system.

The system can include one or more output devices that provide output that is viewable, either immediately or by use of appropriate hardware. The output can be in the form of hard copy or softcopy image(s) corresponding to the image record or provide output in the form of a stored digital file that includes the image(s) in digital form. Output devices include, but are not limited to, a digital photographic printer 128, a soft copy display 301, and a DVD writer 122. The printer can record images on receiver medium using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, the printer will be described as being of a type that generates color images on a paper receiver; however, it will be appreciated that this is not necessary and that the claimed methods and apparatuses herein can be practiced with a printer that prints monotone images such as black and white, grayscale or sepia toned images and with a printer that prints on other types of receivers. The output device can also include combinations of output, such as a printed image and a digital file on a memory unit, such as a CD or DVD which can be used in conjunction with any variety of home and portable viewing device such as a personal media player or flat screen TV.

The display 301 has a display panel 303 that produces a light image and an enclosure in which the display panel is mounted. The display may have additional features related to a particular use. For example, the display can be a television receiver, which decodes television signals from an antenna or a cable television system.

The control unit can have multiple processors, as in FIG. 4, or can have a single processor providing multiple functions. The control unit can reside in any of the components of the multiple component system and, if the control unit has more than one separable module, the modules can be divided among different components of the system. It can be convenient to provide the system, such that the control unit is located in the normal path of video sequences of the system and that separate modules are provided, each being optimized for a separate type of program content. For example, with a system having the purpose of home entertainment, it may be convenient to locate the control unit in the television and/or the set-top box. In a particular embodiment, the control unit has multiple separated modules, but the modules are in one of the television and the set-top box.

In the embodiment of FIG. 4, the control unit 306 has a control processor 202, an audio processor 204, and two digital video processors 206, 208. The control processor operates the other components of the system utilizing stored software and data based upon signals from the user controls and the input units. Some operations of the control processor are discussed below in relation to the method. The audio processor provides a signal to an audio amp 210, which drives speakers 212. The digital video processors send signals to a multiplexer 214 (labelled "MUX" in FIG. 4), which transmits the signal to a display driver 215, which drive the display panel 303. (A pair of display drivers (not shown) could be used instead to drive the display panel. Each display driver would be used alternatively, and would operate on a signal from a respective digital video processor.) Parameters for the processors are supplied from a dedicated memory 216 or memory 304.

The control processor can include, but is not limited to, a programmable digital computer, a programmable microprocessor, a programmable logic processor, a series of electronic circuits, a series of electronic circuits reduced to the form of an integrated circuit, or a series of discrete components. Necessary programs can be provided on fixed or removable memory or the control processor can be programmed, as is well known in the art, for storing the required software programs internally.

"Memory" refers to one or more suitably sized logical units of physical memory provided in semiconductor memory or magnetic memory, or the like. Memory of the system can store a computer program product having a program stored in a computer readable storage medium. Memory can include conventional memory devices including solid state, magnetic, optical or other data storage devices and can be fixed within the system or can be removable. For example, memory can be an internal memory, such as, such as SDRAM or Flash EPROM memory, or alternately a removable memory, or a combination of both. Removable memory can be of any type, such as a Compact Flash (CF) or Secure Digital (SD) type card inserted into a socket and connected to the processor via a memory interface. Other types of storage that are utilized include without limitation PC-Cards, MultiMedia Cards (MMC), or embedded and/or removable hard drives. Data including but not limited to control programs can also be stored in a remote memory system such as a personal computer, computer network or other digital system.

In addition to functions necessary to operate the system, the control unit provides rendering, restoration, and enhancement functions for the image records, as discussed below in detail. In the embodiment of FIG. 4, these functions are provided by the two video processors and the audio processor. Different numbers of the video and audio processors can be provided for these additional functions, as appropriate or convenient to meet particular requirements, or, a single processor unit, controlled by programmable processing parameters, can be used. Additional functions can be provided, such as manual editing of image records and manual intervention in automated (machine-controlled) operations. Necessary programs can be provided in the same manner as with the control processor. The image modifications can also include the addition or modification of metadata, that is, image record-associated non-image information.

The system has a plurality of input units 308. Each input unit has one or more input ports 218 located as convenient for a particular system. Each input port is capable of transmitting an image record to the control unit using an input selector 220. Each input port can accept a different kind of input. For example, one input port can accept image records from DVDs, another can accept image records from satellite television, and still another can accept image records from internal memory of a personal computer connected by a wired or wireless connection.

Each input unit provides a logical and/or physical combination of one or more input ports that all have been predetermined to have a commonality of program content that allows common treatment during image enhancement. For example, referring to FIG. 1, one input unit is provided for broadcast content, which is likely to have been professionally produced, and a second input unit is provided for non-broadcast content, which is likely to have been produced non-professionally. Another example of an input unit (not shown) is for special content having limited image characteristics, such as video game content and Internet television.

The number and different types of input ports, input units, and types of content are not limited. An input port can include or interface with any form of electronic or other circuit or system that can supply the appropriate digital data to the processor. One or more input ports can be provided for a camera or other capture device that can capture content data for use in image records and/or can obtain image records that have been prepared by or using other devices. For example, input ports can include one or more docking stations, intermittently linked external digital capture and/or display devices, a connection to a wired telecommunication system, a cellular phone and/or a wireless broadband transceiver providing wireless connection to a wireless telecommunication network. As other examples, a cable link provides a connection to a cable communication network and a dish satellite system provides a connection to a satellite communication system. An Internet link provides a communication connection to a remote memory in a remote server. A disk player/writer provides access to content recorded on an optical disk. Input ports can provide image records from a memory card, compact disk, floppy disk, or internal memory of a device.

One or more input ports can provide image records from a programming provider. Such input ports can be provided in a set-top box 150. An input port to a programming provider can include other services or content, such as programs for upgrading image processing and other component functions of the system. For example an input port can include or connect to a cable modem that provides program content and updates—either pushed from the cable head-end, or pulled from a website or server accessible by the system.

Figure 5:
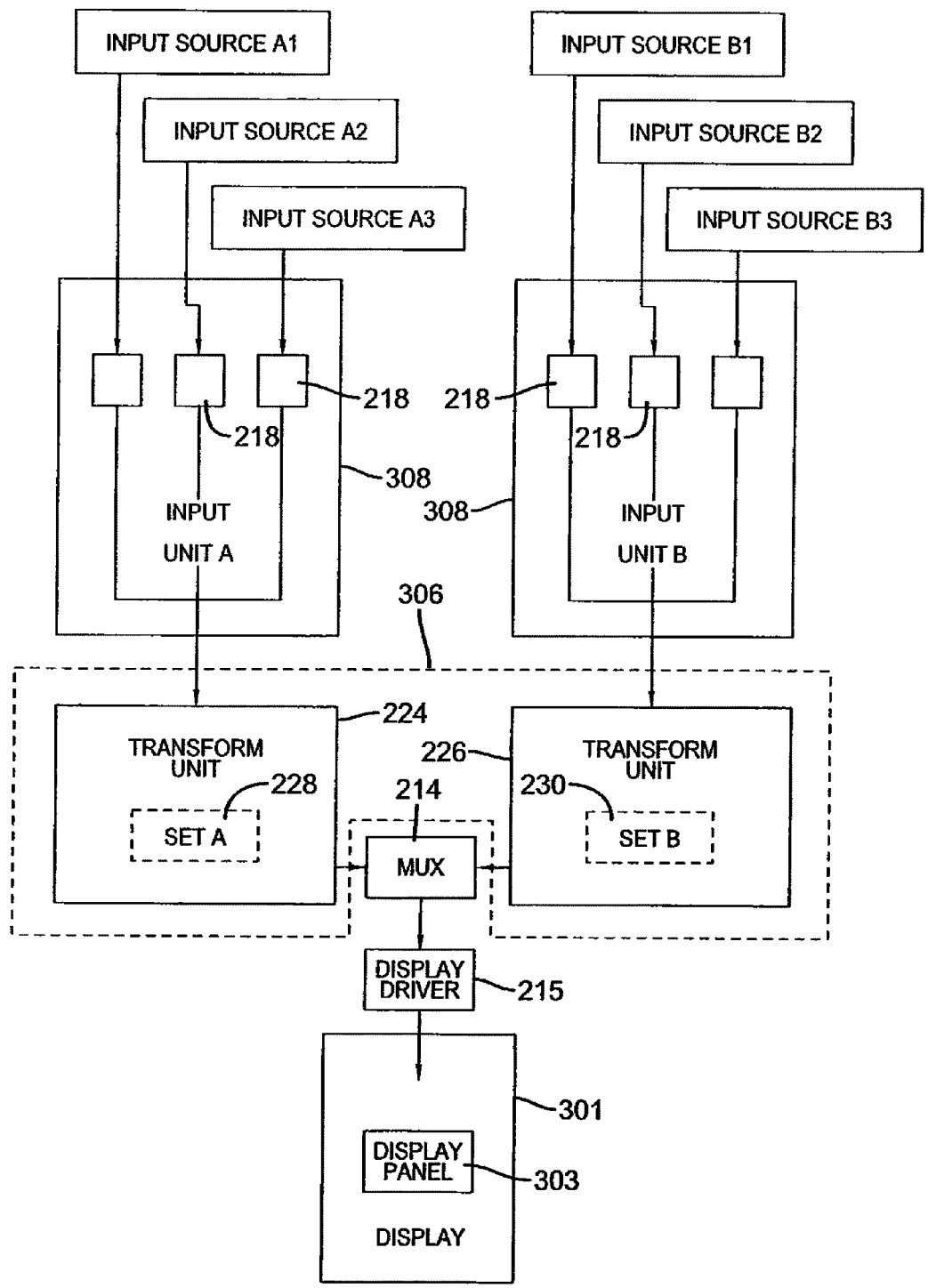
FIG. 5 is a detailed diagrammatical view illustrating two different image processing paths of FIG. 4.

Referring to FIG. 5, the control unit, in providing the enhancement functions, presents two or more different image processing paths. Each path has different logic. In particular embodiments, the paths also differ in physical components. (The two transform units 224, 226 in FIG. 5 each include a respective set of transforms 228, 230. The transform units each represent the hardware and software necessary to provide the required functions.) Alternatively, a single image processing path can be prepared as needed, for example, using a field programmable gate array. In this case, the field programmable gate array is reprogrammed whenever a different path is selected. The image processing of the different paths differ in the enhancement applied to a respective image record.

Each path includes a plurality of image record processing transforms. The transforms can be categorized in three types: rendering transforms that are limited to adapting the image record to a particular output device, restorative transforms that are limited to non-materially altering the image record, and enhancement transforms that are inclusive of materially altering the image record.

Examples of rendering transforms include changes in an image record to match gray scale, color gamut, and white point of a display. Rendering images can produce a display image that is cropped, reduced in resolution and/or contrast levels, or otherwise abridged relative to the original image record.

A distinction can be made between a set of restorative transforms and a set of enhancement transforms on the basis that, while both types of transform enhance, restorative transforms do not materially alter the image record and enhancement transforms materially alter the perceived image record. (Restorative transforms can adjustments for a local viewing environments, such as ambient lighting having a color cast, flare, extraneous audio noise, as the like.) The restorative transforms are intended to only restore degradation in the imaging chain and therefore not materially alter the image record. The enhancement transforms are intended to improve defects in the original image record and therefore materially alter the image record. In the method and system, restorative transforms and enhancement transforms are treated as presenting a continuum of modifications of the input image record, partitioned into the two types by a threshold. The threshold between restorative (non-material) and enhancement (material) can be preset heuristically based upon acceptability of iterative modifications of a training set inclusive of the different types of image records expected as input. Multiple thresholds for a series of paths can be set in a similar manner.

The threshold or thresholds can take a variety of forms. A simple form is a set of binary conditions that all must be met for a set of transforms to be considered restorative. For example, does the set of restorative transforms retain all or change any of the existing values of certain predetermined image characteristics, such as: sharpness, grain, tone scale, color saturation, image stabilization, and noise. As an alternative, probabilistic rules can be used to determine a value to compare to a threshold. For example, a single rule or group of rules can be provided in the form of a Bayesian net. Suitable rules and thresholds can be determined heuristically or by use of automated classification techniques, such as use of a genetic algorithm. Use of these techniques are well known to those of skill in the art.

In a particular embodiment, the system has two paths: a professional path or very-edited path, for which extensive editing during program production is assumed, and a non-professional or unedited path, for which no editing or insignificant editing during program production is assumed. The professional path includes rendering and restorative transforms, but enhancement transforms are excluded to constrain the image processing from materially altering propagated image records. The non-professional path includes rendering transforms, restorative transforms, and enhancement transforms. Material alteration of the propagated image records is permitted.

In all cases, transforms on a particular path can be combined. In the embodiment just above, it may be particularly convenient to combine restorative transforms and enhancement transforms of the non-professional path can be combined for ease of implementation. A modification of this embodiment has a plurality of edit statuses, each at a respective one of a plurality of levels in an increasing sequence from unedited status to very-edited status. The levels of edit status can be stepped and the constraining of digital enhancement can be proportional to the respective level of edit status.

In a particular embodiment, the control unit of the system has two different image processors or physical modules. Each processor is dedicated to a respective path. In this case, each path can optionally be fully isolated from the other, from the respective input unit to the display. This can be advantageous, in that both modules and/or the respective transforms can be updated or otherwise modified independent of the other. A single module and set of transforms can be more complex to change. Paths can alternatively, be partially combined to allow use of common rendering and restoration transforms. If a single processor is used, different paths can be provided by using different video and/or audio processing parameters for the different paths.

Figure 8:
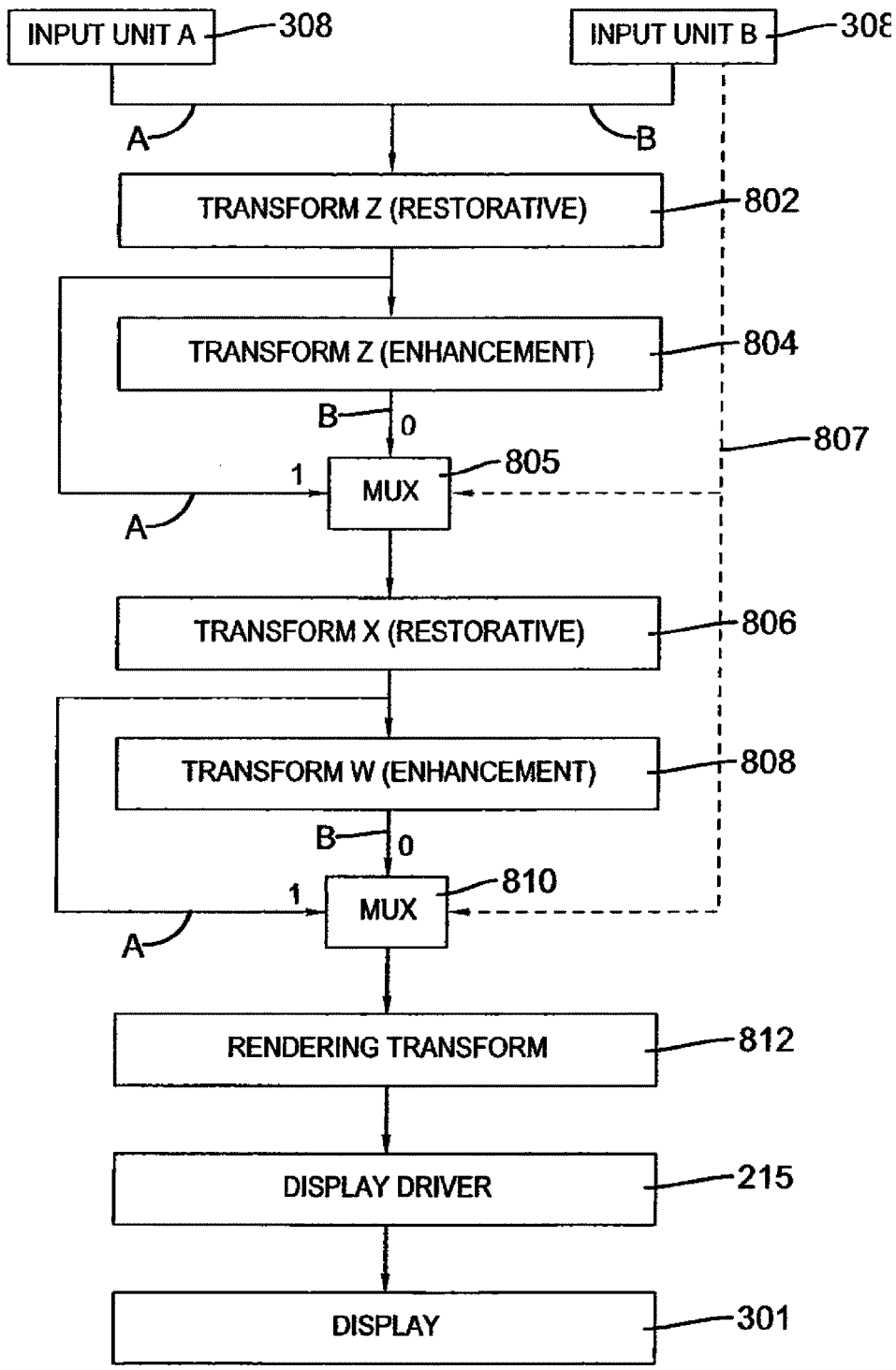
FIG. 8 is another detailed diagrammatical view of an alternative to the image processing paths of claim 5.

Referring to FIG. 8, in particular embodiments, the paths share some logical components. An image record is input through either input unit A 308 or input unit B 308 and then follows the respective path. Both paths are initially together, as both input units 308 transmit the image record to transform Z (reference number 802), which is restorative. Path A then transmits the image record to transform Y (reference number 804), which enhances, and then to multiplexer 805. Path B bypasses transform Y 804 and transmits to multiplexer 805. The image record is then transmitted to transform X (reference number 806), which is restorative. Path A then transmits the image record to transform W (reference number 808), which enhances, and then to multiplexer 810. Path B bypasses transform W 808 and transmits to multiplexer 810. The image record is then transmitted to the rendering transform 812 and to the display driver 215 and display 301. Transmission through multiplexers 810 is controlled by a signal 807 from input unit B. This signal can be provided by control unit 306 as a result of a determination by control unit 306 that the image record was from input unit B. The determination can alternatively be made by simpler logic elements, such as a signal line corresponding to item 807 that transmits when an image record is received in input unit B. It will be understood by those of skill in the art that MPEG or JPEG decompression, or other types of television signal decoding (such as NTSC decoding), can be performed as a part of restorative processing, such as restorative processing by transform Z 802 in FIG. 8.

Figure 6:
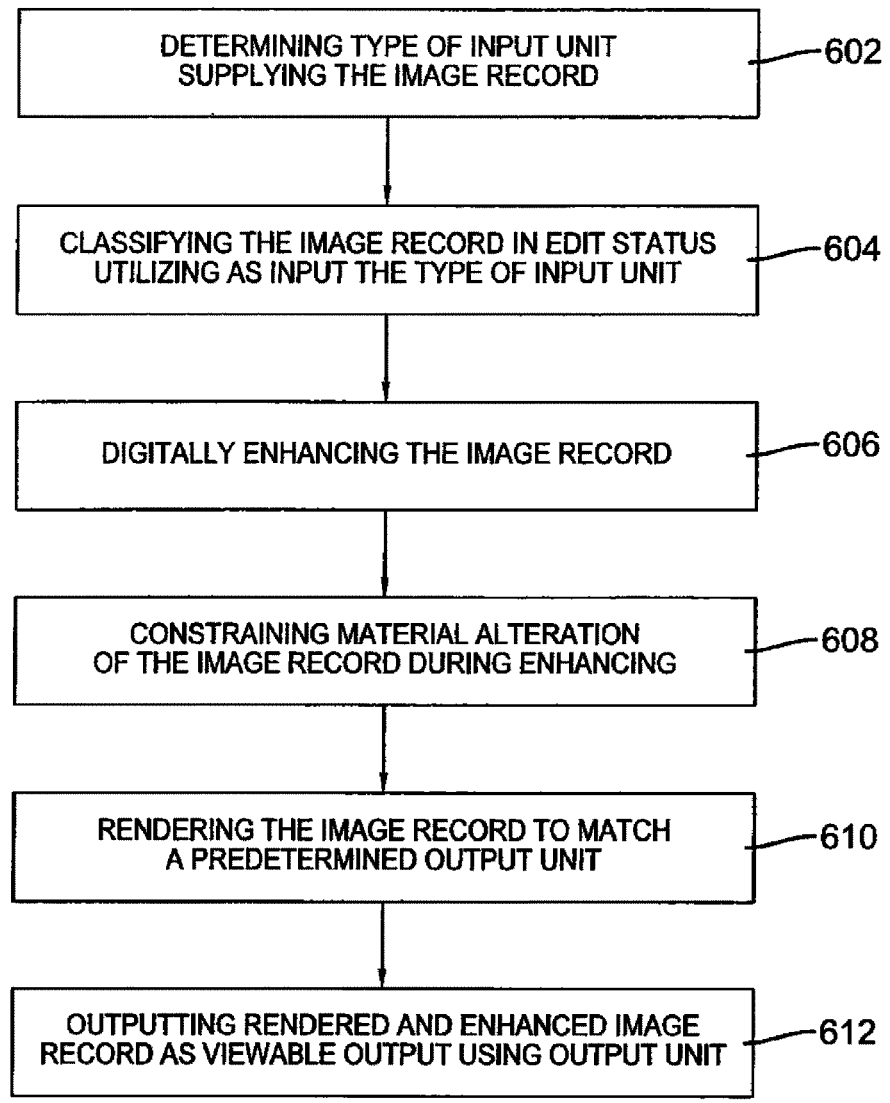
FIG. 6 is a flow chart of an embodiment of the method.

Referring now to FIG. 6, in the method, an image record is initially received into the system through one of the input ports and the type of input unit supplying the image record is determined 602. The image record is classified 604 in an edit status. The classifying 604 utilizes as input, the determined type of input unit. The edit status is one of a plurality of different possible predetermined edit statuses inclusive of unedited and very-edited. The image record is digitally enhanced 606. Material alteration of the image record is constrained 608 during enhancing. The enhancing is more constrained when the edit status is very-edited and the enhancing is less constrained when the edit status is other than very-edited. The image record is rendered 610 to match a predetermined output unit and the rendered and enhanced image record is output 612 in viewable form using the output unit.

The type of input unit can indicate the source of an image record directly or indirectly. In an example of a direct indication, a system can have different input ports built into a television receiver, such as a pair of different card readers and a cable television connection to a tuner. The card readers together form an input unit. Image records from that input unit are classified as being from a consumer content source. The cable television connection-tuner forms another input unit. Image records from that input unit are classified as being from a professional source. As an alternative example, a television receiver can be configured to have various inputs from external devices, including consumer type devices such as camcorders and digital still cameras, and professional type devices such as DVDs and cable TV set-top boxes, using a multiple input connector or the like. In this case, the input unit is defined by user action, such as a designation of a particular input unit or source, or by automatic (machine controlled) recognition of the type of input device connected to the system. A default input unit can be provided, in case the user fails to make a designation.

The classification of the image record can be based solely on the determined type of input unit. In this case, a look-up table or the like can be used to perform the classification. In a particular embodiment, each source corresponds to a different type of input unit and the classifying comprises determining the type of input unit supplying the image record. For example, one of the sources can be defined as broadcast signals, which are preassociated with the very-edited edit status, and another source can be defined as non-broadcast signals, which are preassociated with the unedited edit status. The input unit associated with the broadcast signals source can be a cable connection to a service provider. The input unit associated with the non-broadcast signals source can be a memory card reader.

The classification of the image record can also use additional information, either alternatively, or in combination with the determined type of input unit. The additional information can be metadata and/or analysis results. One or more look-up tables or the like can be provided to associate specific information with particular sources.

The source of an image record can be inferred as part of the classifying, with each source preassociated with one of the edit status levels. Sources can be defined broadly or narrowly, with the understanding that, if sources are defined narrowly and there are a small number of edit status levels, multiple sources may have to be assigned to the same level of edit status. The predetermined set of edit statuses into which an image record can be classified can have one-to-one correspondence with the predetermined sources or several different sources can correspond to a single edit status. The latter approach is currently preferred, since it is more likely to reflect actual consumer use. This approach also allows easy changes when circumstances change. For example, at this time, it is relatively unlikely that an image record having a High Definition signal is of consumer origin. All image records including metadata or analysis results indicating High Definition content can be preassigned to a very-edited status. Over time, as this situation changes, and High Definition consumer capture becomes more prevalent, the classes can be updated to reflect this condition. An update can be delivered to the system via any of the above mention ports. Additionally, as new sources are added, updates can be delivered to the system that augment the ability of the system to select proper edit statuses, add edit statuses, add algorithms, and apply appropriate algorithms. A combination of a High Definition signal and use of memory card port of an input unit can have a default correspondence to a very-edited status and the consumer (or manufacturer) can be give an option of changing to an unedited status when and if circumstances change. Similarly, consumers can be allowed to classify a work as "professional", for example, by allowing addition of metadata providing an indication to that effect.

The metadata can directly or indirectly indicate a source. An example of such metadata is a camera identification provided with a digital still image or video clip from a digital camera or a metadata copyright notice provided with a professional image record. Likewise, metadata can indicate that a DVD was created by a commercial service by converting VHS videotapes. Similarly, metadata can be provided that identifies a director of a movie or some other feature that indicates or suggests a source. Metadata indicating a future, or impossible, or even unlikely date indicative of an unset clock in a consumer camera can be considered as an indication of a non-professional source.

The analysis of digital images in the image records is directed to semantic and nonsemantic saliency features of the images. The saliency features include semantic saliency features, which are structures in the image record having recognizable meanings corresponding to subject matter in a captured image, and structural saliency features, which are features of an image record unrelated to the subject matter. The nature and use of saliency features are discussed in U.S. Pat. No. 6,671,405, to Savakis, et al., entitled "METHOD FOR AUTOMATIC ASSESSMENT OF EMPHASIS AND APPEAL IN CONSUMER IMAGES", which is hereby incorporated herein by reference.

Techniques for analyzing structural saliency features of image records, such as tone scale, contrast, and the like, are well known to those of skill in the art. A variety of data detection and reduction techniques for detecting semantic saliency features can be used, such as face detection, skin detection, people detection, and other object detection. Temporal image analysis of video sequences can also be used for the same purposes. Pattern classification techniques can be used to characterize complex data.

An approach similar to U.S. Pat. No. 6,671,405 to Savakis et al. can be used to provide analysis results relating to the source of an image record. A Bayesian network or a group of networks is used to provide an automatic ranking of image records. In the Bayesian network, a feature extraction stage is followed by a classification stage. The outputs of the feature extraction stage represent statistical evidence of the presence (or absence) of certain features. The outputs are then integrated by the classification stage to compute a value representative of the likelihood that the image is of the type the network is designed to detect. The selection of specific features can be based on a ground truth study using human observers. People features such as the presence or absence of people, the amount of skin or face area and the extent of close-up based on face size can be inputs to a further determination of the semantic understanding of who is in the image. Objective features such as colorfulness and sharpness of the image record can be used and extended by additionally determining image format.

People features can be a valuable input to the method. Images of people can be instrumental in determining if the source of the images is professional or amateur. For example, if the system has been trained to identify a number of people as family members, the inference can be made that any image records containing the family members have been captured with amateur equipment, and the most appropriate image processing path for such images can be applied.

The method can be designed to detect text and graphics that are unlikely to be applied by a consumer, such as titles and credits, and a different source can be indicated on that basis.

Colorfulness and dynamic range can also be used as an objective feature for a network applied to implement the invention. It is likely that a professionally edited image record will take full advantage of the available range of tone and color. Consumer captured image records are likely to be less well controlled, and suffer from poor exposure.

Sharpness can be used as an objective feature. Professionally edited image records rarely provide imagery that is out of focus. Consumer captured image records are frequently out of focus as the consumer capture system hunts to find the subject. Additionally, different capture systems may have different abilities to maintain focus, and the preferred processing may differ accordingly.

Image format can be used as an objective feature. At the time of this writing, for many consumers, it is unlikely that a High Definition signal provided by any source is of consumer origin. While this may change in the future, currently any signal determined to be of High Definition could be assumed to be of professional origin and processed in a manner much different than other signals.

Scene change frequency can be used as an objective feature. Scene changes can be detected by determining abrupt discontinuities in imagery. With videos, this motion-related objective feature can be used to determine the difference between professional and amateur image records, since the professionally edited video sequences tend to have very short scenes while amateur video sequences tend to have very long scenes.

The structural saliency of audio associated with image records can be used as an objective feature. In particular, the noise level associated with professionally edited image records is generally very low, while the noise level associated with consumer captured image records is generally quite high. Additionally, the balance and average level of professionally edited image records is well controlled, while that of consumer captured image records varies much more. Similarly, professionally edited image records are more likely to have a laugh track, quiet periods, and a large amount of stereo separation.

The features detected are input to a classification stage where a value is determined that is used to infer the source of the image sequence. A Bayesian network can be used. It will be understood that the invention is not limited in relation to specific technologies used for these purposes, except as specifically indicated. For example, pattern classification can be provided by any of the following, individually or in combination: rule based systems, semantic knowledge network approaches, frame-based knowledge systems, neural networks, fuzzy-logic based systems, genetic algorithm mechanisms, and heuristics-based systems.

The classification can use the additional information in a hierarchy of two or more kinds of information, with the highest available information taking precedence. For example, in a particular embodiment, a determination is made as to whether metadata, which identifies or indicates an image record source, is associated with the image record. If such metadata is detected, then the source indicated by the metadata solely determines the edit status level. If such metadata is not detected, then the type of input unit solely determines the edit status. Similarly, in another embodiment, the image record is analyzed producing either analysis results indicative of an image record source or non-indicative results. If the indicative analysis results are available, then the source indicated by the analysis results determines the edit status level. If such indicative analysis results are not detected, then the type of input unit solely determines the edit status.

Additional information can always be considered in the classification of the image record or the use of additional information can be made a user option. In that case, the user can set a user-selectable characteristic to a first state or a second state. In the first state, the availability of additional information about the input record is ascertained and, when additional information is available, that information is utilized as input in the classifying. In the second state, the image record is assigned the edit status of the respective type of input unit.

Figure 7:
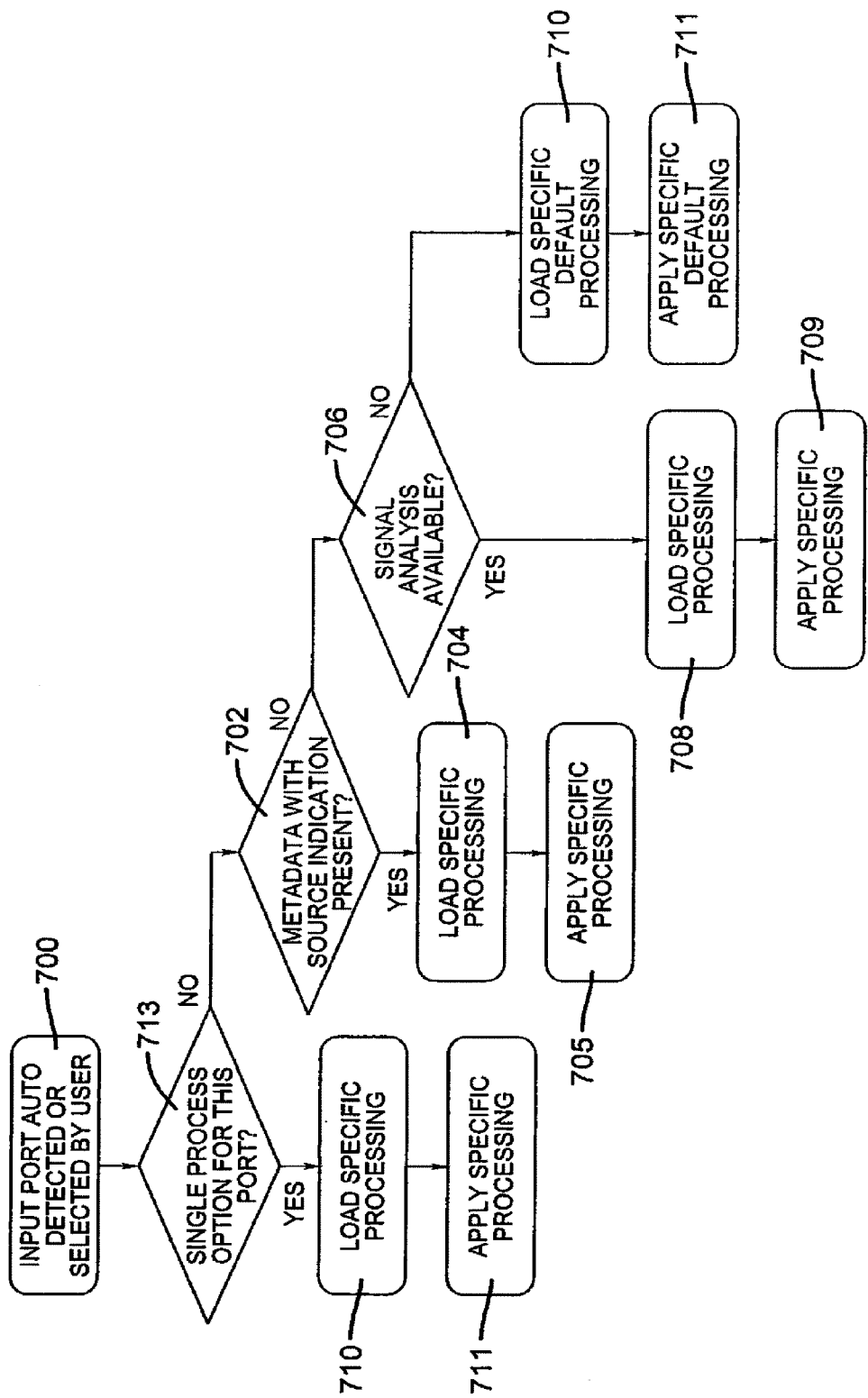
FIG. 7 is a flow chart of some of the details of a particular modification of the method of FIG. 6.

FIG. 7 shows an approach combining the above features. In that embodiment, the input port is determined 700. The input port that is used is automatically detected or is selected by the user. An attempt 702 is then made to read metadata indicating a source associated with the image record. When the metadata is available, the image record is classified to an edit level determined solely by the indicated source. If such metadata is detected, then the source indicated by the metadata solely determines the edit status level and specific processing associated with that edit status is loaded 704 and applied 705. When the metadata is not present or cannot be read, the image record is analyzed 706. When the analysis results indicate a source, the image record is classified to the edit status associated with that source and corresponding software is loaded 708 and applied 709. When the analysis results do not indicate a source, then the image record is classified to the edit statuses associated with the type of input unit for the input port and corresponding processing is loaded 710 and applied 711. In FIG. 7, another option is provided, in which a user can force classifying to be by type of input unit. Detection 713 of this option leads to loading 710 and application 711 of corresponding software.

Referring again to FIG. 6, the image record is digitally enhanced in accordance with the edit status and is rendered for a particular output unit. The rendering provides output matching in which the image record is adjusted so as to be within the limitations of a particular output device. Such limitations include color gamut, available tone scale, and the like. The image record is optionally digitally restored. As earlier discussed, each edit status is associated with a different image processing path. The paths differ at least in terms of the digital enhancement provided. The enhancing can provide a wide variety of modifications of the image record. For example, possible enhancements include: edge enhancement, tone scale modification (histogram stretching and sliding), local and global contrast and brightness alteration, and changes in color saturation.

The method is applied individually to each image record. As earlier indicated, a video sequence or multimedia presentation can be treated as a single image record or as a collection of multiple image records. In the method, a determination can be made as whether to treat a particular video sequence or the like as one or multiple image records can based upon the edit status of the image record determined by the classifying. Additional edit statuses or substatuses (from the same input unit) can be provided for this purpose. For example, a multimedia presentation of a lecture on art appreciation can have digital processing of still image of works of art limited to restoration and rendering and digital processing of a video of the lecturer inclusive of restoration, rendering, and enhancement.

The concept of edit status is based on the assumption that professionally prepared works have been subject to more editing than consumer prepared works. This assumption is not necessarily valid, but is likely to be correct to a great many cases. Additional levels of edit status can also be provided as needed. The categories of edit status represent generalizations and may or may not be accurate in individual cases. For example, it is possible for a card reader to read a file produced professionally, and for DVD players to play back DVDs which were made by transferring consumer videos made by copying low quality consumer camcorder tapes. The method and system are a compromise that provides convenience at the risk of errors in classifying image records into edit statuses. That risk can be made acceptable by heuristically adjusting edit status levels. The edit statuses include an unedited status that corresponds to an arbitrary bottom level and a very-edited status that corresponds to an arbitrary top level. As the names suggest, it is preferred that the bottom level is inclusive of image records that lack any editing and the top level is inclusive of image records that have been subject to much more extensive editing. Adjustment of a threshold between these levels and the addition of additional levels and adjustment of appropriate thresholds can be provided for more advanced users. If there arises a condition in which the system is unable to infer an edit status to an image record, the default adopted by the system can be for the top level, since this is least likely to create an objectionable condition when an image record for which enhancement is not intended or necessary is erroneously enhanced.

The following are examples of some different paths. A first is a consumer camcorder path. This path provides digital enhancements based on the assumption that the camcorder has a limited quality microphone and audio production values. Audio processing is provided to reduce ambient noise, to equalize the audio levels (eliminating very quiet and very loud sections). The image record is also subject to digital image stabilization on the assumption the adequate stabilization was not earlier provided. The image stabilization can use the stabilization algorithm described in U.S. Patent Application Publication No. US2006/0274156A1, filed by Rabbani et al. May 17, 2005, entitled "IMAGE SEQUENCE STABILIZATION METHOD AND CAMERA HAVING DUAL PATH IMAGE SEQUENCE STABILIZATION", in which stabilization includes cropping of the original image record. Image color and tone scale are also corrected on similar assumptions. This same path (and same edit status) can also be used for DVDs produced on a home computer.

Another path is for DVDs of a Hollywood film or other professional movie. An assumption is made that the DVD produced from a professional movie is based on the director carefully controlling the DVD mastering process to ensure that it conforms to the director's artistic vision. Other than for rendering, the path excludes color, tone, and noise processing, or only includes restorative image transforms that have been predetermined to not change the "look" of the image record. The intent is to make the displayed image record look as close as possible to that intended by the director.

Another path is for terrestrial television programs. An assumption can be made that the content is intended to have a particular look, but that the input image record is degraded. Restoration can be provided to the extent that degradation is known. In addition, moderately constrained enhancement, such as some limited amount of color and tone adjustments, and noise cleaning, is provided to ameliorate further degradation at the risk of some loss of the intended "look".

The invention has been described in detail with particular reference to certain preferred embodiments thereof, but it will be understood that variations and modifications can be effected within the spirit and scope of the invention.

The invention claimed is:

1. A method for producing viewable output from an image record, the method comprising the steps of:
   determining one of a plurality of different types of input unit supplying the image record;
   ascertaining availability of additional information about the input record, wherein said ascertaining comprises determining availability of metadata associated with the image record, said metadata indicating a respective one of a plurality of predetermined image record sources, and wherein when said metadata is unavailable said ascertaining further comprises analyzing said image record to provide one of: analysis results indicative of one of said plurality of predetermined image record sources and non-indicative results;
   classifying the image record into one of a predetermined plurality of different edit statuses, said classifying utilizing as input the determined said type of input unit, said edit statuses being inclusive of unedited status and very-edited status, wherein each of said plurality of predetermined image record sources is associated with a corresponding edit status, and wherein when said additional information is available, said additional information is utilized as input in said classifying such that when said metadata is available the image record is assigned the edit status associated with the respective said image record source, and when said metadata is unavailable and said analysis results are available the image record is assigned the edit status associated with the respective image record source indicated by said analysis results;
   digitally enhancing the image record;
   constraining material alteration of the image record during said enhancing, said enhancing being more constrained when said edit status is very-edited and said enhancing being less constrained when said edit status is other than very-edited;
   rendering the image record to match a predetermined output unit; and
   outputting said rendered and enhanced image record.

2. The method of claim 1 wherein said constraining further comprises providing a first image processing path when said edit status is very-edited and a second image processing path when said edit status is unedited, each said path having a different set of image processing transforms.

3. The method of claim 2 wherein said providing further comprises programming a field programmable gate array responsive to said classifying.

4. The method of claim 1 wherein said enhancing is only restorative when said edit status is very-edited.

5. The method of claim 1 wherein said input units are of two different types and said classifying further comprises assigning the image record said unedited status when said input unit is one of said two different types and assigning the image record said very-edited status when said input unit is another of said two different types.

6. The method of claim 1 wherein said edit status is one of a plurality of levels in an increasing sequence from unedited status to very-edited status, said constraining is inversely proportional to the level of a respective said edit status in said sequence.

7. The method of claim 6 wherein said classifying further comprises inferring one of a plurality of predetermined sources to be a respective source of the image record, each said source being preassociated with a respective one of said levels.

8. The method of claim 7 wherein one of said sources is broadcast signals and another of said sources is non-broadcast signals, said broadcast signals being preassociated with said very-edited edit status, said non-broadcast signals being preassociated with said unedited edit status.

9. The method of claim 1 wherein each said type of input unit is preassociated with one of said edit statuses and said classifying further comprises assigning the image record the edit status of the respective said type of input unit, when said metadata and said analysis results are unavailable.

10. The method of claim 1 wherein each said type of input unit is preassociated with one of said edit statuses and said classifying further comprises:
  determining whether a user-selectable characteristic is set to a first state or a second state;
  when said user-selectable characteristic is in said first state:
    (a) ascertaining availability of additional information about the input record; and
    (b) when said additional information is available, utilizing said additional information as input in said classifying; and
  when said user-selectable feature is in said second state, assigning the image record the edit status of the respective said type of input unit.

11. The method of claim 1 wherein said image record includes both audio and video content and said enhancing alters both said audio content and said video content.

12. A method for producing viewable output from an image record, the method comprising the steps of:
  determining one or more items of information about the image record, said determined items including a respective one of a plurality of different types of input unit supplying the image record;
  determining availability of metadata associated with the image record, said metadata indicating a respective one of a plurality of predetermined image record sources,
  when said metadata is unavailable analyzing said image record to provide one of: analysis results indicative of one of said plurality of predetermined image record sources and non-indicative results;
  classifying the image record as one of a plurality of different edit statuses based on said information, said edit status being one of a plurality of edit statuses in an increasing sequence from unedited status to very-edited status, wherein each of said plurality of predetermined image record sources is associated with a corresponding edit status, and wherein when said metadata is available the image record is assigned the edit status associated with the respective said image record source, and when said metadata is unavailable and said analysis results are available the image record is assigned the edit status associated with the respective image record source indicated by said analysis results;
  processing said image record using a respective one of a plurality of different sets of image processing transforms, each of said sets being associated with a respective one of said edit statuses, said processing with each of said sets including rendering the image record to match a predetermined display, said processing with said set associated with said very-edited status being relatively more constrained from material alterations in the image record than said set associated with said unedited status; and
  providing the viewable output of the image record following said processing.

13. A method for producing viewable output from an image record, the method comprising the steps of:
  determining one of a plurality of different types of input unit supplying the image record;
  determining availability of metadata associated with the image record, said metadata indicating a respective one of a plurality of predetermined image record sources;
  when said metadata is unavailable analyzing said image record to provide one of: analysis results indicative of one of said plurality of predetermined image record sources and non-indicative results;
  classifying the image record in one of a plurality of edit statuses based on the determined type of input unit, said plurality of edit statuses having different levels in an increasing sequence from unedited status to very-edited status, wherein each of said plurality of predetermined image record sources is associated with a corresponding edit status, and wherein when said metadata is available the image record is assigned the edit status associated with the respective said image record source, and when said metadata is unavailable and said analysis results are available the image record is assigned the edit status associated with the respective image record source indicated by said analysis results;
  rendering the image record to match a predetermined display;
  digitally enhancing the image record; and
  constraining material alteration of the image record during said enhancing, said constraining being inversely proportional to the respective level of said classified edit status, whereby said constraining is maximized when said edit status is very-edited status and said constraining is minimized when said edit status is unedited status.

14. A method for producing viewable output from an image record, the method comprising the steps of:
  determining one of a plurality of different types of input unit supplying the image record;
  determining availability of metadata associated with the image record, said metadata indicating a respective one of a plurality of predetermined image record sources,
  when said metadata is unavailable analyzing said image record to provide one of: analysis results indicative of one of said plurality of predetermined image record sources and non-indicative results;
  classifying the image record into one of a predetermined plurality of different edit statuses, said classifying utilizing as input the determined said type of input unit, said edit statuses being inclusive of unedited status and very-edited status, wherein each of said plurality of predetermined image record sources is associated with a corresponding edit status, and wherein when said additional information is available, said additional information is utilized as input in said classifying such that when said metadata is available the image record is assigned the edit status associated with the respective said image record source, and when said metadata is unavailable and said analysis results are available the image record is assigned the edit status associated with the respective image record source indicated by said analysis results; and digitally enhancing the image record, wherein material alteration of the image record is constrained during said enhancing, said enhancing being more constrained when said edit status is very-edited and said enhancing being less constrained when said edit status is other than very-edited.

15. The method of claim 14 wherein each said type of input unit is preassociated with one of said edit statuses and said classifying further comprises assigning the image record the edit status of the respective said type of input unit, when said metadata and said analysis results are unavailable.

* * * * *